United States Patent [19]

Tanaka et al.

[11] Patent Number: 5,075,184

[45] Date of Patent: Dec. 24, 1991

[54] SEALED TYPE LEAD ACID STORAGE BATTERY

[75] Inventors: Akio Tanaka; Yoshinobu Kakizaki, both of Gifu, Japan

[73] Assignee: Nihon Muki Kabushiki Kaisha, Tokyo, Japan

[21] Appl. No.: 566,797

[22] Filed: Aug. 13, 1990

Related U.S. Application Data

[63] Continuation of Ser. No. 314,273, Feb. 22, 1989, abandoned, which is a continuation of Ser. No. 124,426, Nov. 18, 1987, abandoned, which is a continuation of Ser. No. 710,188, Mar. 11, 1985, abandoned.

[30] Foreign Application Priority Data

Mar. 12, 1984 [JP] Japan ................................ 59-45683

[51] Int. Cl.$^5$ ............................................. H01M 2/16
[52] U.S. Cl. ....................................... 429/144; 429/252
[58] Field of Search ................. 429/136, 144, 145, 252

[56] References Cited

U.S. PATENT DOCUMENTS

| | | | |
|---|---|---|---|
| 2,117,371 | 5/1938 | Slayter | 429/145 |
| 2,511,887 | 6/1950 | Vinal | 429/144 |
| 3,014,085 | 12/1961 | Bachman | 429/145 |
| 3,711,332 | 1/1973 | Bastacky | 429/136 |
| 4,216,281 | 8/1980 | O'Rell et al. | 429/252 |
| 4,361,632 | 11/1982 | Weber et al. | 429/145 |
| 4,414,295 | 11/1983 | Uba | 429/145 X |

Primary Examiner—Stephen J. Kalafut
Attorney, Agent, or Firm—Armstrong, Nikaido, Marmelstein, Kubovcik & Murray

[57] ABSTRACT

An integrated composite-type separator sheet for use in a sealed type lead acid storage battery comprising: (i) at least one pressed fiber layer of a first type consisting essentially of glass fibers having an average diameter of 0.1–2 $\mu$, and (ii) a pressed fiber layer of a second type consisting essentially of glass fibers having an average diameter of 3–10 $\mu$, said pressed fiber layer of the second type having a thickness at least equal to the thickness of the pressed fiber layer of the first type.

The separator and battery of this invention have the following advantages: good close contact between the separator and the electrode plates maintained for a long time during the use of the battery, and greatly improved performance of the battery and its service life, as compared with conventional batteries.

11 Claims, 2 Drawing Sheets

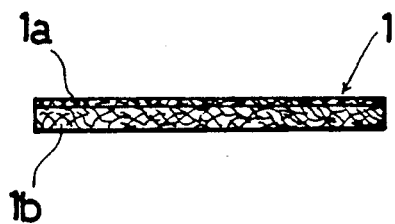
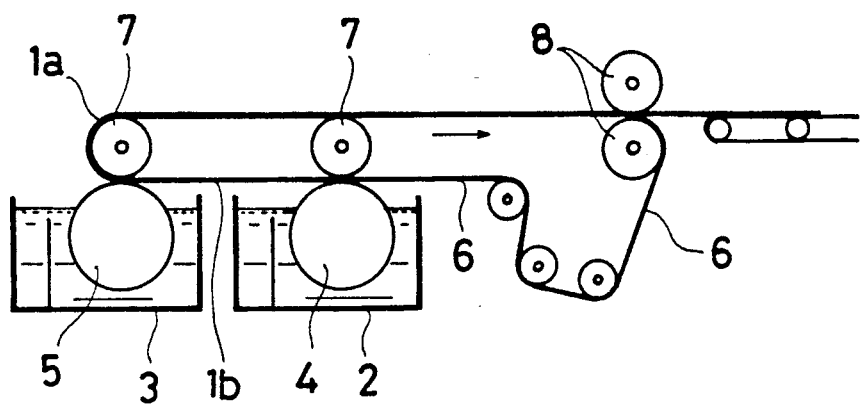
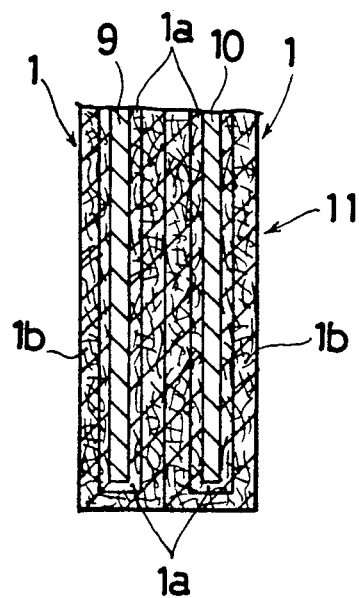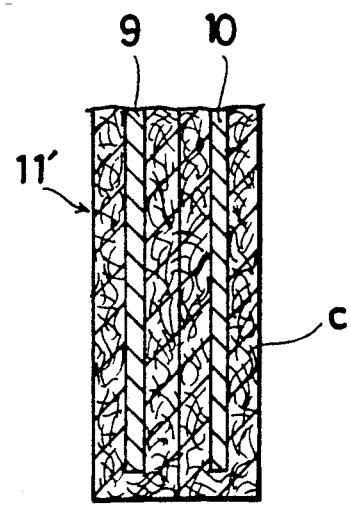

SEALED TYPE LEAD ACID STORAGE BATTERY

This application is a continuation of application Ser. No. 314,273 filed Feb. 22, 1989, which is a continuation of Ser. No. 124,426 filed Nov. 18, 1987 which is a continuation of Ser. No. 710,188 filed Mar. 11, 1985, now all abandoned.

BACKGROUND OF THE INVENTION

This invention relates to a sealed type lead acid storage battery, in particular, a battery in which oxygen gas generated during operation or charging is absorbed in the negative electrode plate. In a conventional battery of this kind, a cell unit comprises a separator of 0.5-3.0 mm in thickness comprising a single layer which consists only of glass fibers having an average diameter of $0.1-3.0\mu$, or a single layer which consists mostly of the foregoing glass fibers mixed with a small amount of fibrillation synthetic fibers. The separator is interposed between a negative electrode plate and a positive electrode plate to form a cell unit. The desired number of cell units are compressed in a battery container and an aqueous dilute sulfuric acid electrolyte is impregnated in and held by the separators.

The above conventional battery is, however, disadvantageous in that although the separator has a density as low as 0.2 g/cm$^3$ and is a good absorbent of the electrolyte, when the separator is impregnated with the electrolyte its thickness is decreased. Also, as the amount of impregnated electrolyte becomes smaller, the thickness of the separator is liable to decrease. Consequently, the initial good close contact of the separator with the opposing surfaces of the negative electrode plate and the positive electrode plate is lost. As a result, the performance of the battery and its residual capacity are readily reduced, shortening the service life of the battery or causing other problems.

In order to minimize the above disadvantages, the decrease in the thickness of the separator caused by the impregnation of the electrolyte in the battery cells is usually compensated as much as posible by increasing the compression force applied to the assembly of cells contained in the battery container. However, the density of the separator is consequently increased, therefore reducing its absorption of the electrolyte. As a result, the amount of the electrolyte impregnated in the separator is liable to become insufficient, and the performance of the battery is significantly poor.

Accordingly, it is desirable to provide a battery wherein the separators retain good electrolyte-absorbing and holding properties for a long time, and do not exhibit a decrease in thickness as a result of being impregnated with the electrolyte.

SUMMARY OF THE INVENTION

In view of the above disadvantages associated with conventional batteries, the purpose of this invention is to provide a sealed type lead acid storage battery which is free from these disadvantages and meet the above stated goals. This battery is characterized in that at least one sheet of separator consisting of integrated composite layers is interposed between the negative electrode plate and the positive electrode plate to form a cell unit, the separator sheet comprising at least one pressed fiber layer of a first type consisting essentially of glass fibers having an average diameter of $0.1-2.0\mu$, and a pressed fiber layer of a second type consisting essentially of glass fibers having an average diameter of $3-10\mu$, said pressed fiber layer of the second type having a thickness at least equal to the thickness of the pressed fiber layer of the first type, with the pressed fiber layer of the first type being in contact with both a surface of the negative electrode plate and a surface of the positive electrode plate, such two surfaces facing each other across the separator sheet. The cell unit or cell units are compressed between the walls of the battery container in order to bring the pressed fiber layers and the electrodes into contact with each other.

DESCRIPTION OF THE DRAWINGS

FIG. 1 shows a sectional side view of one example of a separator used in the battery of this invention.

FIG. 2 is a diagrammatical view of an apparatus suitable for making the separator used in the battery of this invention.

FIG. 3 is a sectional side view of one cell unit in a properly compressed state inside a container of a sealed type lead acid storage battery.

FIG. 6 is an example of a conventional cell unit.

DESCRIPTION OF THE INVENTION

Figure 4:
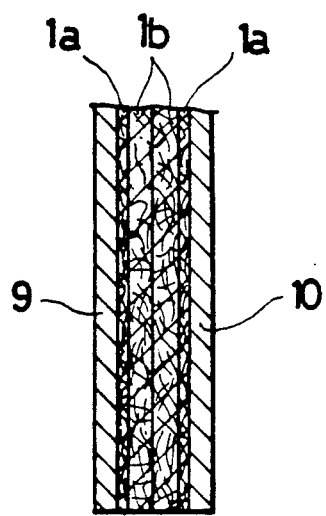
FIG. 4 is a modified example of the cell unit.

Embodying examples of this invention are described below with reference to the accompanying drawings.

FIG. 1 shows a sectional view of a separator 1 used in a sealed type lead acid storage battery according to this invention. The separator 1 comprises integrated composite layers prepared by combining, by a paper making process, a first pressed fiber layer 1a consisting essentially of acid resistant glass fibers having an average diameter of $0.1-2.0\mu$, and has a density of 0.2 g/cm$^3$ or less, and a thickness of 0.2-0.5 mm, and with a second pressed fiber layer consisting essentially of acid resistant glass fibers having an average diameter of $3-10\mu$ and having a thickness equal to or greater than the thickness of the pressed paper layer of the first type. In general, the thickness of the separator is in the range of 0.5-3.0 mm.

The separator 1 is, for instance, made by a paper making apparatus as shown in FIG. 2. Numerals 2 and 3 denote a first paper making tank and a second paper making tank respectively, which are disposed adjacent to one another. Numerals 4 and 5 denote a first cylinder paper machine and a second cylinder paper machine, respectively.

In the first tank 2, a mixture of 95 wt. % of acid resistant glass fibers having an average diameter in the range $3-10\mu$, and 5 wt. % of fibrillation acrylic fibers is mixed with water to prepare a pressed fiber stock. In the second tank 3, acid resistant glass fibers having an average diameter in the range of $0.1-2.0\mu$ are mixed with water to prepare a pressed fiber stock. Numeral 6 denotes a continuous felt being moved in the direction of the arrow by the guide rollers 7, 7 while being kept in contact with the cylinder paper machines 4, 5. Numerals 8, 8 denote a pair of pressure rollers disposed above and below the continuous felt 6 at the front end of the travel path of the felt.

The above apparatus is operated as follows. A pressed fiber layer of the second type 1b prepared by the first paper making machine 4 is transferred to the continuous felt 6, and while the continuous felt is advancing, a pressed fiber layer of the first type 1a prepared by the second paper making machine 5 is transferred to the surface of the pressed fiber layer of second type so that the two pressed fiber layers 1a and 1b may be combined together, and a long sheet of the resultant integrated composite layer (1a,1b) is pressed by the pair of pressure rollers 8, 8 positioned ahead, and thereafter is dried by a drying section apparatus after passing through a section box, or without passing through the same, and is cut to a given size to produce the integrated composite-type separator sheets 1 comprising a pressed fiber layer of the second type 1b provided on one of its surfaces with a pressed fiber layer of the first type 1a, as shown in FIG. 1.

Separator sheets used in the battery of this invention, hereinafter called "separators of this invention", (Samples No. 1 and No. 2) and comparison separators (Samples No. 3 and No. 4) were made by the foregoing paper making apparatus, using the materials shown in Table 1, and varying the size of the glass fibers, the thickness of the pressed fiber layer of the first type, and the thickness of the pressed fiber layer of the second type, as shown in Table 2.

TABLE 1

|  | Amount of Glass fiber % | Fibrillation Acrylic fiber % |
|---|---|---|
| First type layer | 100 wt % | 0 wt % |
| Second type layer | 95 wt % | 5 wt % |

In addition, a conventional separator comprising a single layer (Sample No. 5) was prepared by using only the second paper making machine in the above apparatus. The electrolyte absorption ratio (or percentage) and other characteristics were measured in all the samples. The results are shown in Table 2.

It can be seen from Table 2 that the separators of this invention (No. 1 and No. 2), and the comparison separator No. 3 can retain an electrolyte absorption ratio as high as 90 wt % or more in the compression-free state. However, when the average diameter of the glass fibers in the pressed fiber layer of the second type is 11μ, as in comparison separator No. 4, the electrolyte absorption ratio of the separator is lowered remarkably to 80 wt %, which is not a desirable value.

Batteries were constructed using the foregoing separators No. 1–No. 5 and the properties of the constructed batteries were tested as follows.

which has been bent into a U shape, with the bottom on the U shape enclosing the bottom edge of the respective electrode plate. As a result of this arrangement, the pressed fiber layer of the first type 1a of each separator is brought into contact with both surfaces of the respective electrode plate, and the pressed fiber layer 1b of one separator is adjacent to and in direct contact with the pressed fiber layer of the second type of the other electrode plate. The assembly comprising the positive electrode plate, the negative electrode plate, and the separator sheets constitutes a cell unit 11. The desired number of cell units is assembled and compressed inside a battery container with a load or compression force of 10 kg/dm$^2$ and impregnated with an aqueous sulfuric acid electrolyte.

A cell unit 11' was assembled using the conventional separator (Sample No. 5) as follows. Each of two conventional separator sheets is folded into a U shape so as to wrap the positive electrode plate 9 and the negative electrode plate 10, respectively, in the same manner as described above. A battery was constructed by using the same number of cells as in the above described battery of this invention, and the cells are subjected to the same compression force and impregnated with the same electrolyte.

Each of the batteries constructed above has the characteristics described in Table 3.

TABLE 3

| Item | Size and other particulars | Remark |
|---|---|---|
| Positive plate | 60 W × 90 H × 3 T* | 2 sheets |
| Negative plate | 60 W × 90 H × 2 T* | 3 sheets |
| Pitch between cells | 8.5 mm |  |
| Inner width of battery container | 19 mm |  |
| Electrolyte | Aqueous sulfuric acid specific gravity 1.300 | 120 cc/cell |

*W is width, H is length, and T is thickness, all in mm.

For each of the above batteries, a discharge test and a lifetime (life cycle) test were carried out as follows, and the residual capacities and the number of life cycles of the batteries were measured.

TABLE 2

| Sample No. | Classification of layers | Mean diameter of glass fibers μ | Thickness* mm | Apparent density g/cm$^3$ | Electrolyte absorption ratio % | Average pore diameter μ |
|---|---|---|---|---|---|---|
| Separator of this invention 1 | First type | 0.5 | 0.2 | 0.15 | 92 | 11 |
|  | Second type | 3.0 | 0.8 | 0.20 |  |  |
| Separator of this invention 2 | First type | 0.5 | 0.5 | 0.15 | 92 | 12 |
|  | Second type | 5.0 | 0.5 | 0.22 |  |  |
| Comparison separator 3 | First type | 0.5 | 0.7 | 0.15 | 91 | 15 |
|  | Second type | 7.0 | 0.3 | 0.25 |  |  |
| Comparison separator 4 | First type | 0.5 | 0.2 | 0.15 | 80 | 18 |
|  | Second type | 11.0 | 0.8 | 0.30 |  |  |
| Conventional separator 5 | Single layer | 0.5 | 1.0 | 0.15 | 94 | 10 |

*The thickness represents a value measured when the product is applied with a load, that is, compression force of 20 kg/dm$^2$.

Each of the foregoing separators is assembled with a positive electrode plate and a negative electrode plate into a cell unit wherein, as shown in FIG. 3, the positive electrode plate 9 and the negative electrode plate 10 are respectively enfolded in the respective separator sheet $$\text{Residual Capacity} = \frac{\text{10 hours } - \text{ rate capacity } Ah}{\text{10 hours } - \text{ rate capacity } Ah} \times 100 \, (\%)$$
$$\text{at 25° C. after left to stand for 15 days at 65° C.}$$
$$\text{at 25° C. after full charge}$$

In the lifetime test, one cycle means that a battery is discharged for 2 hours at 2.5 A in a thermostatic chamber kept at 40° C., and then is charged for 2.5 hours. The discharge capacity is measured after every 50 cycles, and the total number of life cycles until the time when the discharge capacity becomes 60% of the initial capacity is determined to be the lifetime of the battery.

The results of the discharge test and lifetime test are shown in Table 4.

TABLE 4

| Sample No. | Discharge test (3 batteries for each sample) | | Lifetime test (3 batteries for each sample) | |
|---|---|---|---|---|
| | Residual Capacities of 3 batteries % | Average Residual Capacity of 3 batteries % | Number of life cycles of 3 batteries | Average number of life cycles of 3 batteries |
| 1 | 55–60 | 58.3 | 410–440 | 427 |
| 2 | 55–60 | 56.6 | 400–430 | 418 |
| 3 | 20–40 | 31.6 | 165–285 | 237 |
| 4 | 10–30 | 25.5 | 100–200 | 180 |
| 5 | 15–40 | 28.3 | 100–285 | 205 |

As is clear from Tables 2 and 4, the batteries using the separators of this invention (No. 1 and No. 2) are remarkably higher in residual capacity and lifetime than the batteries using the conventional separator. This means that the separators of this invention can retain their initial good electrolyte absorption and do not have their thickness substantially decreased by the impregnation of the electrolyte. Consequently, the close or good contact of the separators of this invention with the negative and positive electrode plates can be maintained for a long time.

In contrast, the conventional batteries using the separator No. 5 have low residual capacity and shorter lifetime. This means that the conventional separator has good electrolyte absorption as shown in Table 2, but its thickness is decreased by impregnation of the electrolyte, and consequently the initial close contact of the conventional separator with the electrode plates is reduced or lost, and the lifetime of the batteries is thereby shortened.

With respect to the batteries using the comparison separator No. 3, it can be seen from the poor values of their residual capacity and life cycle in Table 4 that, by virtue of their structure wherein the thickness of the pressed fiber layer of the first type is greater than the thickness of the pressed fiber layer of the second type, a remarkable decrease is caused in the thickness of the separator when it is impregnated with the electrolyte, such decrease being almost as large as when a conventional separator is used. Therefore, the comparison separator is not an improvement over the conventional separator.

With respect to the batteries using the comparison separator No. 4, it has been confirmed that not only is their electrolyte absorption poor as compared with batteries using the conventional separator No. 5, as shown in Table 2, but their electric properties are also poorer, because the pressed fiber layer of the second type in the comparison separator comprises only glass fibers having an average diameter of 11μ.

Further, we have found that when fibrillation synthetic fibers are mixed in the pressed fiber layer of the second type, it is preferable to add the fibrillation synthetic fibers in the range of 1–10 wt. %, based on the weight of the layer of the second type. Furthermore, we have found that the repulsion or resilient property of the separator of this invention against the compression force, and thus the improvement of the close contact between the separator and the electrode plates, can be achieved by adding 10–30 wt. % of acid resistant synthetic monofilament fibers of 1.5–3.0 deniers, based on the weight of the mixture of glass fibers and acid resistant fibrillation synthetic fibers in the pressed fiber layer of the second type.

The above findings will be explained in greater detail as follows.

In the pressed fiber layer of the second type having the composition shown in Table 1, acrylic monofilament fibers of 1.5 deniers are added in the respective amounts shown in Table 5, in order to prepare separator Samples No. 6, No. 7 and No. 8 having pressed fiber layers of the second type of the composition shown in Table 5. Batteries were assembled using these separators, in the same manner as described above, and discharge tests and lifetime tests were carried out on those batteries in the same manner as described above. The results of these tests are shown in Table 6.

TABLE 5

| Sample No. | | Synthetic monofilament mixture wt % | Mean fiber diameter of glass fibers μ | Thickness mm | Apparent density g/cm³ | Electrolyte absorption ratio % | Pore diameter μ |
|---|---|---|---|---|---|---|---|
| 6 | First type | — | 0.5 | 0.2 | 0.15 | 90 | 11 |
| | Second type | 30 | 3.0 | 0.8 | 0.16 | | |
| 7 | First type | — | 0.5 | 0.5 | 0.20 | 90 | 12 |
| | Second type | 30 | 5.0 | 0.5 | 0.15 | | |
| 8 | First type | — | 0.5 | 0.2 | 0.15 | 83 | 15 |
| | Second type | 40 | 5.0 | 0.8 | 0.23 | | |

TABLE 6

| Sample No. | Discharge test | | Lifetime test | |
|---|---|---|---|---|
| | Residual Capacities of 3 batteries % | Average residual capacity of 3 batteries % | Number of life cycles of 3 batteries | Average number of life cycles of 3 batteries |
| 6 | 58–65 | 60.0 | 400–450 | 430 |
| 7 | 55–60 | 57.5 | 400–450 | 425 |
| 8 | 35–45 | 42.0 | 250–350 | 300 |

In the comparing the results shown on Table 4 and on Table 6, it can be seen that the batteries using the separators No. 6 and No. 7, in which the pressed fiber layers of the second type further contain the synthetic monofilament fibers, have improved residual capacity and lifetime, as compared with the batteries using the separators No. 1 and No. 2 which do not contain the additional synthetic monofilament fibers. It can be seen also that when the amount of synthetic monofilament fibers is 40 wt. %, there is no improvement in the electric properties of the battery.

Alternatively, instead of adding the synthetic monofilament fibers to the mixture of glass fibers and acid resistant fibrillation synthetic fibers, glass fibers having a diameter in the range of 12–30μ were added to the pressed fiber layer of the second type having the composition shown in Table 1, in order to prepare the separator samples No. 9, No. 10 and No. 11 having the respective compositions shown in Table 7, wherein the weight percentage is based on the weight of the mixture of glass fibers and acid resistant fibrillation synthetic fibers. The separator samples were assembled with negative and positive electrode plates to form cell units. These cell units were assembled into batteries in the same manner and under the same conditions as described above. Discharge tests and lifetime tests were carried out with these batteries, and the results are shown in Table 8.

In comparing the results in Table 4 and Table 8, it can be seen that the batteries using the separator Samples No. 9 and No. 10, in which 30 wt. % of glass fibers having a diameter of mostly 12–13μ are added in the pressed fiber layer of the second type, have better properties than the batteries using the separators not containing these additional glass fibers. However, if the amount of added glass fibers is 40%, no improvement is shown, as in Sample No. 11.

TABLE 7

| Sample No. | | Glass fiber mixture wt % | Average diameter of glass fibers μ | Thickness mm | Apparent density g/cm³ | Electrolyte absorption ratio % | Pore diameter μ |
| --- | --- | --- | --- | --- | --- | --- | --- |
| 9 | First type layer | — | 0.5 | 0.2 | 0.15 | 92 | 11 |
|   | Second type layer | 30 | 3.0 | 0.5 | 0.22 | | |
| 10 | First type layer | — | 0.5 | 0.5 | 0.15 | 90 | 12 |
|   | Second type layer | 30 | 5.0 | 0.5 | 0.25 | | |
| 11 | First type layer | — | 0.5 | 0.2 | 0.15 | 88 | 15 |
|   | Second type layer | 40 | 3.0 | 0.8 | 0.25 | | |

TABLE 8

| | Discharge test | | Lifetime test | |
| --- | --- | --- | --- | --- |
| Sample No. | Residual Capacities of 3 batteries % | Average residual capacity of 3 batteries | Number of life cycles of 3 batteries | Average number of life cycles of 3 batteries |
| 9 | 57–62 | 59.5 | 400–460 | 440 |
| 10 | 56–60 | 58.0 | 400–450 | 430 |
| 11 | 30–40 | 36.5 | 170–230 | 210 |

In addition, we have found that the separators of this invention improve the distribution of the electrolyte, as described below. Separator samples No. 1, No. 2, No. 6, No. 7, No. 9 and No. 10 were assembled into respective batteries in the same manner as described above. In accordance with testing method JIS D5301, the 5C discharge tests (1C=10HR capacity value) was carried out at a low temperature of 0° C. for each of the batteries, and their discharge electric voltages were measured after 5 seconds and 30 seconds from the start of the discharge. The results, as shown in Table 9, confirm that the voltages of the batteries using the separators of this invention are improved by 15% or more after 5 seconds from discharge, and by about 20% after 20 seconds from discharge, as compared with conventional batteries. Thus, the distribution of the electrolyte in the cells of the batteries can be accelerated, as compared with that in conventional batteries, when the batteries are discharged at a high discharge rate and a low temperature.

The embodying examples of this invention which have been described and tested in the foregoing show that batteries constructed according to this invention have remarkably improved residual capacity and life cycle. The examples described show cell units wherein two separators of this invention are folded into a U-shape covering the negative electrode plate and the positive electrode plate, respectively, the pressed fiber layer of the first type in each U-shaped separator being in contact with both surfaces of the electrode plate covered by the U-shaped separator.

TABLE 9

| Sample No. | | Electric voltage 5 seconds after discharge % | Electric voltage 30 seconds after discharge % |
| --- | --- | --- | --- |
| Conventional product | 5 | 100 | 100 |
| Product of this invention | 6 | 118 | 120 |
| Product of this invention | 7 | 115 | 118 |
| Product of this invention | 8 | 116 | 120 |
| Product of this invention | 9 | 115 | 117 |
| Product of this invention | 10 | 117 | 119 |
| Product of this invention | 11 | 115 | 118 |

Of course, the separator of this invention is not limited to be used in its U-shaped folded state, but may be used in other manners. For example, as shown in FIG. 4, two separator sheets, without being folded, are pressed together between the positive electrode plate 9 and the negative electrode plate 10, with the pressed fiber layers of the second type in the respective separator sheets being adjacent to each other, and the pressed fiber layer of the first type in each separator sheet being in contact with a surface of the adjacent electrode plate.

Figure 5:
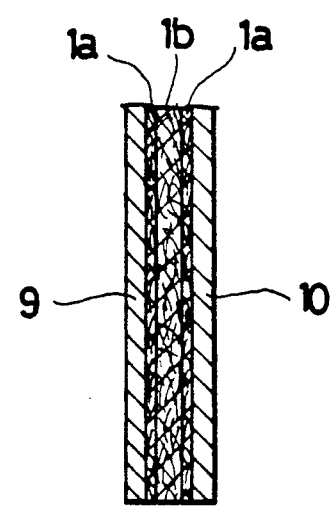
FIG. 5 is another modified example of the cell unit.

Alternatively, a separator sheet could be assembled as shown in FIG. 5, with a single pressed fiber layer of the second type 1b provided on both of its surfaces with a pressed fiber layer of the first type 1a. This simple separator sheet can be used without being folded, and the assembly of the cells and the assembly of the battery can be very easily carried out with this type of separator.

Thus, according to this invention, there is provided an integrated composite-type separator sheet comprising at least one pressed fiber layer consisting essentially of glass fibers having an average diameter of 0.1–2.0μ, and a pressed fiber layer of a second type consisting essentially of glass fibers having an average diameter of 3–10μ, said pressed fiber layer of the second type having a thickness at least equal to the thickness of the pressed fiber layer of the first type.

There is further provided according to this invention a sealed type lead acid storage battery comprising at least one cell unit positioned inside a sealed battery container, wherein said cell unit comprises a negative electrode plate, a positive electrode plate, and at least one separator of this invention interposed between the two electrodes. The desired number of cell units is positioned inside a battery container in an appropriately compressed state, and are impregnated with electrolyte, to produce a battery.

The separator of this invention and the battery of this invention have the following advantages associated therewith. The decrease in the thickness of the separator which is caused by impregnation of the electrolyte is prevented, and good close contact between the separator and the electrode plates can be maintained for a long time during the use of the battery. Therefore, the performance of the battery and its service life can be greatly improved as compared with conventional batteries using a separator comprising a single layer consisting only of glass fibers having an average diameter of $0.1$–$3.0\mu$, or as compared with batteries using a separator comprising a single layer consisting mostly of glass fibers having an average diameter of $0.1$–$3.0$ $\mu m$, and further comprising a smaller amount of fibrillation synthetic fibers. In addition, the distribution speed of the electrolyte over the whole of the separator of this invention is greatly improved, therefore resulting in a good battery.

What is claimed is:

1. A sealed lead acid storage battery comprising at least one cell unit positioned inside a sealed battery container, wherein said cell unit comprises:
   (a) a negative electrode plate;
   (b) a positive electrode plate; and
   (c) at least one integrated composite separator sheet interposed between said negative electrode plate and said positive electrode plate, said separator sheet comprising:
      (i) at least one pressed fiber layer of a first type consisting of glass fibers having an average diameter of $0.1$–$2\mu$, and
      (ii) a pressed fiber layer of a second type consisting of a mixture of 99–90% by weight of glass fibers having an average diameter of $3$–$10\mu$ and 1–10% by weight of acid resistant fibrillation synthetic fibers,
   wherein said pressed fiber layer of the second type has a thickness at least equal to the thickness of the pressed fiber layer of the first type, and
   wherein said pressed fiber layer of the first type is brought into direct contact with both a surface of the negative electrode plate and a surface of the positive electrode plate, said two surfaces facing each other across said separator sheet, by compressing the cell unit between the walls of the battery container, and said pressed fiber layer of the second type is not in direct contact with the negative electrode plate and the positive electrode plate.

2. A storage battery as in claim 1, wherein said cell unit comprises two separator sheets each consisting of one pressed fiber layer of the first type and one pressed fiber layer of the second type, and each separator sheet is folded into a U shape so as to cover the negative electrode plate and the positive electrode plate respectively, the pressed fiber layer of the first type in each U-shaped separator being in contact with both surfaces of the electrode plate which is covered by the U-shaped separator sheet.

3. A storage battery as in claim 1, wherein said cell unit comprises two separator sheets each consisting of one pressed fiber layer of the first type and one pressed fiber layer of the second type, and the separator sheets are positioned adjacent to each other between the negative electrode plate and the positive electrode plate in a manner such that the pressed fiber layers of the second type in the respective separator sheets are adjacent to each other, and the pressed fiber layer of the first type of each separator sheet is in contact with a surface of the adjacent electrode plate.

4. A storage battery as in claim 1, wherein said cell unit comprises one separator sheet interposed between the negative electrode plate and the positive electrode plate, said separator sheet comprising a single pressed fiber layer of the second type which is provided on each of its two surfaces with a pressed fiber layer of the first type, said pressed fiber layer of the first type being also in contact with a surface of the adjacent electrode plate.

5. A storage battery as in claim 1, wherein the thickness of the pressed fiber layer of the first type is $0.2$–$0.5$ mm, and the thickness of the separator sheet is $0.5$–$3.0$ mm.

6. An integrated composite separator sheet for use in a sealed type lead acid storage battery which comprises at least one cell unit positioned inside a sealed battery container, wherein said cell unit comprises a negative electrode plate, a positive electrode plate, and said integrated composite separator sheet interposed between said negative electrode plate and said positive electrode plate, said integrated composite separator sheet comprising:
   (i) at least one pressed fiber layer of a first type consisting of glass fibers having an average diameter of $0.1$–$2\mu$, and
   (ii) a pressed fiber layer of a second type consisting of a mixture of 99–90% by weight of glass fibers having an average diameter of $3$–$10\mu$ and 1–10% by weight of acid resistant fibrillation synthetic fibers,
   wherein said pressed fiber layer of the second type has a thickness at least equal to the thickness of the pressed fiber layer of the first type, and
   said pressed fiber layer of the first type is in direct contact with both a surface of the negative electrode plate and a surface of the positive electrode plate, said two surfaces facing each other across the separator sheet, and said pressed fiber layer of the second type is not in direct contact with the negative electrode plate and the positive electrode plate.

7. A separator sheet as in claim 6, wherein the thickness of the pressed fiber layer of the first type is $0.2$–$0.5$ mm, and the thickness of the separator sheet is $0.5$–$3.0$ mm.

8. A sealed lead acid storage battery comprising at least one cell unit positioned inside a sealed battery container, wherein said cell unit comprises:
   (a) a negative electrode plate;
   (b) a positive electrode plate; and
   (c) at least one integrated composite separator sheet interposed between said negative electrode plate and said positive electrode plate, said separator sheet comprising:
      (i) at least one pressed fiber layer of a first type consisting of glass fibers having an average diameter of $0.1$–$2\mu$, and (ii) a pressed fiber layer of a second type consisting of: a mixture of 99–90% by weight of glass fibers having an average diameter of 3–10µ and 1–10% by weight of acid resistant fibrillation synthetic fibers; and 10–30% by weight of acid resistant synthetic monofilament fibers of 1.5–3 deniers, based on the weight of said mixture of glass fibers and acid resistant fibrillation synthetic fibers, wherein said pressed fiber layer of the second type has a thickness at least equal to the thickness of the pressed fiber layer of the first type, and wherein said pressed fiber layer of the first type is brought into direct contact with both a surface of the negative electrode plate and a surface of the positive electrode plate, said two surfaces facing each other across said separator sheet, by compressing the cell unit between the walls of the battery container, and said pressed fiber layer of the second type is not in direct contact with the negative electrode plate and the positive electrode plate.

9. An integrated composite separator sheet for use in a sealed type lead acid storage battery which comprises at least one cell unit positioned inside a sealed battery container, wherein said cell unit comprises a negative electrode plate, a positive electrode plate, and said integrated composite separator sheet interposed between said negative electrode plate and said positive electrode plate, said integrated composite separator sheet comprising:

(i) at least one pressed fiber layer of a first type consisting of glass fibers having an average diameter of 0.1–2µ, and (ii) a pressed fiber layer of a second type consisting of: a mixture of 99–90% by weight of glass fibers having an average diameter of 3–10µ and 1–10% by weight of acid resistant fibrillation synthetic fibers; and 10–30% by weight of acid resistant synthetic monofilament fibers of 1.5–3 deniers, based on the weight of said mixture of glass fibers and acid resistant fibrillation synthetic fibers, wherein said pressed fiber layer of the second type has a thickness at least equal to the thickness of the pressed fiber layer of the first type, and said pressed fiber layer of the first type is in direct contact with both a surface of the negative electrode plate and a surface of the positive electrode plate, said two surfaces facing each other across the separator sheet, and said pressed fiber layer of the second type is not in direct contact with the negative electrode plate and the positive electrode plate.

10. A sealed lead acid storage battery comprising at least one cell unit positioned inside a sealed battery container, wherein said cell unit comprises:

(a) a negative electrode plate;

(b) a positive electrode plate; and (c) at least one integrated composite separator sheet interposed between said negative electrode plate and said positive electrode plate, said separator sheet comprising:

(i) at least one pressed fiber layer of a first type consisting of glass fibers having an average diameter of 0.1–2µ, and (ii) a pressed fiber layer of a second type consisting of: a mixture of 99–90% by weight of glass fibers having an average diameter of 3–10µ and 1–10% by weight of acid resistant fibrillation synthetic fibers; and at most 30% by weight of glass fibers having substantially a diameter of 12–30µ, based on the weight of said mixture of glass fibers and acid resistant fibrillation synthetic fibers, wherein said pressed fiber layer of the second type has a thickness at least equal to the thickness of the pressed fiber layer of the first type, and wherein said pressed fiber layer of the first type is brought into direct contact with both a surface of the negative electrode plate and a surface of the positive electrode plate, said two surfaces facing each other across said separator sheet, by compressing the cell unit between the walls of the battery container, and said pressed fiber layer of the second type is not in direct contact with the negative electrode plate and the positive electrode plate.

11. An integrated composite separator sheet for use in a sealed type lead acid storage battery which comprises at least one cell unit positioned inside a sealed battery container, wherein said cell unit comprises a negative electrode plate, a positive electrode plate, and said integrated composite separator sheet interposed between said negative electrode plate and said positive electrode plate, said integrated composite separator sheet comprising:

(i) at least one pressed fiber layer of a first type consisting of glass fibers having an average diameter of 0.1–2µ, and (ii) a pressed fiber layer of a second type consisting of: a mixture of 99–90% by weight of glass fibers having an average diameter of 3–10µ and 1–10% by weight of acid resistant fibrillation synthetic fibers; and at most 30% by weight of glass fibers having substantially a diameter of 12–30µ, based on the weight of said mixture of glass fibers and acid resistant fibrillation synthetic fibers, wherein said pressed fiber layer of the second type has a thickness at least equal to the thickness of the pressed fiber layer of the first type, and said pressed fiber layer of the first type is in direct contact with both a surface of the negative electrode plate and a surface of the positive electrode plate, said two surfaces facing each other across the separator sheet, and said pressed fiber layer of the second type is not in direct contact with the negative electrode plate and the positive electrode plate.

* * * * *